United States Patent
Gotou et al.

(10) Patent No.: US 6,435,686 B1
(45) Date of Patent: Aug. 20, 2002

(54) LIGHT CONDUCTING PLATE FOR A BACK LIGHTING DEVICE AND BACK LIGHTING DEVICE

(75) Inventors: Takumi Gotou; Masatoshi Yamamoto; Shuichi Fujiyoshi, all of Izumiohtsu (JP)

(73) Assignee: The Ohtsu Tire & Rubber Co., Ltd., Izumiohtsu (JP)

(*) Notice: Subject to any disclaimer, the term of this patent is extended or adjusted under 35 U.S.C. 154(b) by 0 days.

(21) Appl. No.: 09/512,216

(22) Filed: Feb. 24, 2000

(30) Foreign Application Priority Data

Feb. 26, 1999 (JP) .......................... 11-052019
Jul. 27, 1999 (JP) .......................... 11-212684

(51) Int. Cl.⁷ .............................................. F21V 7/04
(52) U.S. Cl. .................. 362/31; 362/560; 362/561; 362/558; 349/65
(58) Field of Search .............. 362/31, 560, 561, 362/558; 349/62, 65

(56) References Cited

U.S. PATENT DOCUMENTS

| | | | |
|---|---|---|---|
| 5,178,447 A | * | 1/1993 | Murase et al. ............... 362/31 |
| 5,779,338 A | * | 7/1998 | Ishikawa et al. ............. 362/31 |
| 6,079,840 A | * | 6/2000 | Ono et al. .................... 362/31 |

FOREIGN PATENT DOCUMENTS

| JP | 61-60282 | 3/1986 |
|---|---|---|
| JP | 2-178627 | 7/1990 |
| JP | 4-62519 | 2/1992 |
| JP | 5-281535 | 10/1993 |
| JP | 6-160642 | 6/1994 |
| JP | 6-300922 | 10/1994 |
| JP | 7-151922 | 6/1995 |
| JP | 8-43636 | 2/1996 |
| JP | 8-184714 | 7/1996 |
| JP | 9-061631 | 3/1997 |
| JP | 9-197135 | 7/1997 |

\* cited by examiner

*Primary Examiner*—Sandra O'Shea
*Assistant Examiner*—Ali Alavi
(74) *Attorney, Agent, or Firm*—Burns, Doane, Swecker & Mathis, LLP (57) ABSTRACT

A light conducting plate and a back lighting device provided with the light conducting plate, in which the luminance in a light-outlet face is made uniform by disposing, on a reflecting face having a light-scattering region and the remainder region on the side near to and/or the side distant from a light-inlet end face to reduce the degree of scattering in the remainder region, or by surface-roughening the light-inlet end face to remove the dark line caused by imaging of the light-inlet end face.

17 Claims, 12 Drawing Sheets

LIGHT CONDUCTING PLATE FOR A BACK LIGHTING DEVICE AND BACK LIGHTING DEVICE

BACKGROUND OF THE INVENTION

The present invention relates to a light conducting plate for a back lighting device of an edge-light type to be used in a display device such as a liquid crystal display, and to a back lighting device provided with a linear light source and others.

As back lighting devices for a liquid crystal display device such as a liquid crystal Television or a portable personal computer, those of a so-called edge-light type in which the light emitted from a linear light source irradiates the liquid crystal display device through a light conducting plate are often used. The back lighting device is constructed by disposing a linear light source opposite to a light-inlet end face of the light conducting plate. The light conducting plate is made of an acrylic resin, and has an about wedge-like shape in which a reflecting face for reflecting the introduced light into the light conducting plate and a light-outlet face for allowing the light to emit to the outside of the light conducting plate are formed in a non-parallel configuration.

A diffusing plate, a first prism sheet, a second prism sheet, and a protective sheet are superposed on the light-outlet face of the light conducting plate, and a reflecting plate is superposed on the reflecting face of the light conducting plate. The light source which is housed in a chassis is facing the light-inlet end face on a thick side of the light conducting plate. The first and second prism sheets each have a prism surface on an upper surface or a lower surface thereof. The reflecting face of the light conducting plate is subjected to a white dot printing process or a surface-roughening process to aid the reflection and scattering of the introduced light for improvement in the luminance of the light-outlet face. In recent years, due to the demand in cost reduction and the problems of exhaust liquid of the printing ink, the reflecting face is often subjected to the surface-roughening process rather than the printing process.

In a back lighting device having such a construction, the light emitted from the linear light source is introduced through the light-inlet end face of the light conducting plate to be reflected by the reflecting face and the reflecting plate and is transmitted through the light conducting plate in a direction intersecting the light-inlet end face to emit through the light-outlet face of the light conducting plate. The light that has emitted repeats a process of being diffused and condensed while being transmitted through the diffusing plate and the two prism sheets, thereby to irradiate the liquid crystal display device disposed on an upper layer of the back lighting device.

Also, in recent years, due to the demand for thickness reduction and cost reduction of the liquid crystal display devices, those without the use of a diffusing plate or those with the use of only one prism sheet are being developed. The luminance of such a back lighting device is heightened by performing a prism processing on the light-outlet (light-emitting) face of the light conducting plate, or by devising a prismatic shape of the prism sheet.

As described above, a light-scattering surface is formed on the reflecting face of the light conducting plate for a back lighting device by performing a white dot printing process or a satin finishing process on the entire region of the reflecting face. This allows the introduced light to be scattered by the reflecting face to reduce the luminance nonuniformity of the light-outlet face. Further, in some light conducting plates, the density of dots or the density of recesses and projections on the light-scattering surface is made different between a region near to the light source and a region distant from the light source. For example, by allowing the density on the near region to be lower than that on the distant region, high emission of light caused by being the inlet side of the introduced light is buffered. This reduces the difference in the luminance of the light-outlet face between the side near to the light source and the side distant from the light source.

However, since the region of the light-outlet face near to the light-inlet end face is influenced by refraction which occurs when the light emitted from the light source is transmitted through the light-inlet end face, there will be a large difference in luminance on the region as compared with a central region of the light-outlet face, raising a problem that abnormal light-emission occurs even if the density of dots or the density of recessed and projections on the reflecting face is reduced. Further, there has been a problem that, although a reflecting tape is allowed to adhere to the surface opposite to the light-inlet end face for preventing leakage of the light introduced into the light conducting plate, abnormal light-emission occurs also on a region of the light-outlet face near to the reflecting tape by being influenced from reflection at the reflecting tape.

Furthermore, in the back lighting device having the aforementioned construction, the reflecting face of the light conducting plate is often subjected to a surface-roughening process rather than a printing process, as described before. In the case where a light conducting plate subjected to the printing process is used, the prism sheet is disposed so that the prism surface thereof faces upwards. However, in the case where a light conducting plate subjected to the surface-roughening process is used, conversely, the prism sheet is disposed so that the prism surface thereof faces towards the light conducting plate side. Since the light-inlet end face of the light conducting plate is a mirror-like surface, the light-inlet end face is imaged when the prism surface of the prism sheet faces towards the light conducting plate, thereby raising a problem that a dark line appears on the light-outlet face.

BRIEF SUMMARY OF THE INVENTION

The present invention has been made in order to solve the aforementioned problems, and an object of the present invention is to provide a light conducting plate for a back lighting device and a back lighting device in which the abnormal light emission of the light-outlet face is prevented by disposing a light-scattering region and a remainder region on the reflecting face. Another object of the present invention is to provide a light conducting plate for a back lighting device and a back lighting device in which the dark line on the light-outlet face is removed by performing a surface-roughening process on the light-inlet end face. Still another object of the present invention is to provide a light conducting plate for a back lighting device and a back lighting device in which the leakage of light caused by the surface roughening process of the light-inlet end face is prevented.

A light conducting plate for a back lighting device according to the present invention comprises a light-inlet end face for introducing light emitted from a light source to be disposed facing said light conducting plate; a reflecting face for reflecting the light introduced through said light-inlet end face; and a light-outlet face disposed opposite to said reflecting face for allowing the light reflected from the reflecting face to emit therethrough, characterized in that said reflecting face includes a light-scattering region and a remainder region, and the remainder region is located on a side near to said light-inlet end face.

In this invention, the light-scattering region is not formed on a region of the reflecting face near to the light-inlet end face. The light-scattering region means a region where a face scattering light is formed, and the remainder region means a region where the light-scattering region is not formed. The remainder region has a smaller degree of light scattering as compared with the light-scattering region and, therefore, the scattering of the introduced light is reduced on the remainder region, whereby a side of the light-outlet face closer to the light-inlet end face shows the same degree of luminance as the central portion by suppression of the abnormal light-emission.

A light conducting plate for a back lighting device according to the present invention comprises a light-inlet end face for introducing light emitted from a light source to be disposed facing said light conducting plate; a reflecting face for reflecting the light introduced through said light-inlet end face; and a light-outlet face disposed opposite to said reflecting face for allowing the light reflected from the reflecting face to emit therethrough, characterized in that said reflecting face includes a light-scattering region and the remainder region, and the remainder region is located on a side near to an opposite face from said light-inlet end face.

In this invention, the light-scattering region is not formed on a region of the reflecting face near to an opposite face from the light-inlet end face. The remainder region except the light-scattering region on the reflecting face has a smaller degree of light scattering as compared with the light-scattering region and, therefore, the scattering of the introduced light is reduced on the remainder region, whereby a side of the light-outlet face distant from the light-inlet end face shows the same degree of luminance as the central portion by suppression of the abnormal light-emission.

A light conducting plate for a back lighting device according to the present invention is characterized in that said reflecting face includes a remainder region except said light-scattering region, on the side near to said light-inlet end face and on the side near to an opposite face from said light-inlet end face.

In this invention, the light-scattering region is not formed on regions of the reflecting face near to and distant from the light-inlet end face. The remainder region has a smaller degree of light scattering as compared with the light-scattering region. The scattering of light is reduced on the inlet side and its opposite side of the light conducting plate where more light is reflected in a complex manner, whereby the region near to and the region distant from the light-inlet end face both show the same degree of luminance as the central portion to produce uniform luminance of the light-outlet face.

A light conducting plate for a back lighting device according to the present invention is characterized in that said remainder region is a region having less irregularity of reflection of the introduced light than said light-scattering region.

Further, a light conducting plate for a back lighting device according to the present invention is characterized in that said light-scattering region has been subjected to dot printing on a surface thereof, and said remainder region is a mirror-like surface.

Still further, a light conducting plate for a back lighting device according to the present invention is characterized in that said light-scattering region has an irregular surface, and said remainder region is a mirror surface.

In this invention, said light-scattering region is formed, for example, by performing a dot ink printing process with white ink. The remainder region that maintains a mirror state at the time of molding without printing has a less degree of irregular reflection of light than the light-scattering region and has reduced concentration of light, so that the luminance of the light-outlet face becomes uniform.

A back lighting device according to the present invention comprises a light conducting plate described above; a light source disposed facing said light-inlet end face of said light conducting plate; and a reflector being superposed on said reflecting face of said light conducting plate, characterized in that said reflector includes a light-absorbing region located on a region facing said remainder region of said light conducting plate.

In this invention, since the light-absorbing region is formed on the region of the reflector located facing the remainder region of the light conducting plate, the reflected light on a side of the reflector near to and/or distant from the light source is absorbed, whereby the abnormal light-emission is further suppressed.

Furthermore, a light conducting plate for a back lighting device according to the present invention comprises a light-inlet end face for introducing light emitted from a light source to be disposed facing said light conducting plate; a reflecting face having a light-scattering region for reflecting the light introduced through said light-inlet end face; and a light-outlet face disposed opposite to said reflecting face for allowing the light reflected from the reflecting face to emit therethrough, characterized in that said light-inlet end face is a roughened surface.

In this invention, since the light-inlet end face is a roughened surface, the light emitted from the light source is scattered by the light-inlet end face to be introduced into the light conducting plate, thereby preventing generation of a dark line on the light-outlet face.

A light conducting plate for a back lighting device according to the present invention is characterized in that said light-inlet end face is a roughened surface, and said reflecting face includes the remainder region except said light-scattering region, on the side near to said light-inlet end face.

In this invention, the region of the reflecting face near to the light-inlet end face maintains, for example, a mirror state without forming a light-scattering region. As described above, the imaging of the light-inlet end face in the case where the remainder region is formed by surface roughening instead of printing is prevented by roughening the light-inlet end face. However, when the degree of roughness of the light-inlet end face is too large, leakage of light occurs. By allowing the region of the reflecting face near to the light-inlet end face to be maintained in a mirror-like surface state, the region has a smaller light scattering as compared with the light-scattering region. Since reflection and scattering of the light introduced into the light conducting plate is suppressed in the remainder region, leakage of light caused by the surface roughening of the light-inlet end face is prevented.

A light conducting plate for a back lighting device according to the present invention is characterized in that said remainder region is disposed in a central region along said light-inlet end face.

In this invention, since the regions of the light-outlet face corresponding to both end sides of the light-inlet end face have a low luminance than the central region, it is sufficient that the region for suppressing leakage of light is formed only on the central portion where the luminance tends to be high, so that the light-scattering region is located on both end sides. This can prevent leakage of light on the light-outlet face, and too low luminance of the region corresponding to both ends of the light source can be avoided.

A light conducting plate for a back lighting device according to the present invention is characterized in that said light-scattering region has an irregular surface, and said remainder region is a mirror-like surface.

In this invention, the light-scattering region has a face where the reflecting face is made to include recesses and projections, and the method for forming them is, for example, chemical etching, sand blasting, molding of the light conducting plate with a mold pattern, or a dot pattern formation by laser radiation. The remainder region maintains the mirror-like surface formed at the time of injection molding of the light conducting plate. By not performing the printing process on the reflecting face, the cost can be reduced, and the problem of exhaust liquid of the printing ink can be solved.

A back lighting device according to the present invention is characterized by comprising a light conducting plate described above; and a light source disposed facing said light-inlet end face of said light conducting plate.

In this invention, the back lighting device is constructed by disposing the light source facing the light-inlet end face of the light conducting plate, whereby the luminance of the light-outlet face is made uniform as described above.

The above and further objects and features of the invention will more fully be apparent from the following detailed description with accompanying drawings.

DETAILED DESCRIPTION OF THE INVENTION

Hereafter, the present invention will be described in detail with reference to the attached drawings showing embodiments thereof.

Embodiment 1

Figure 1:
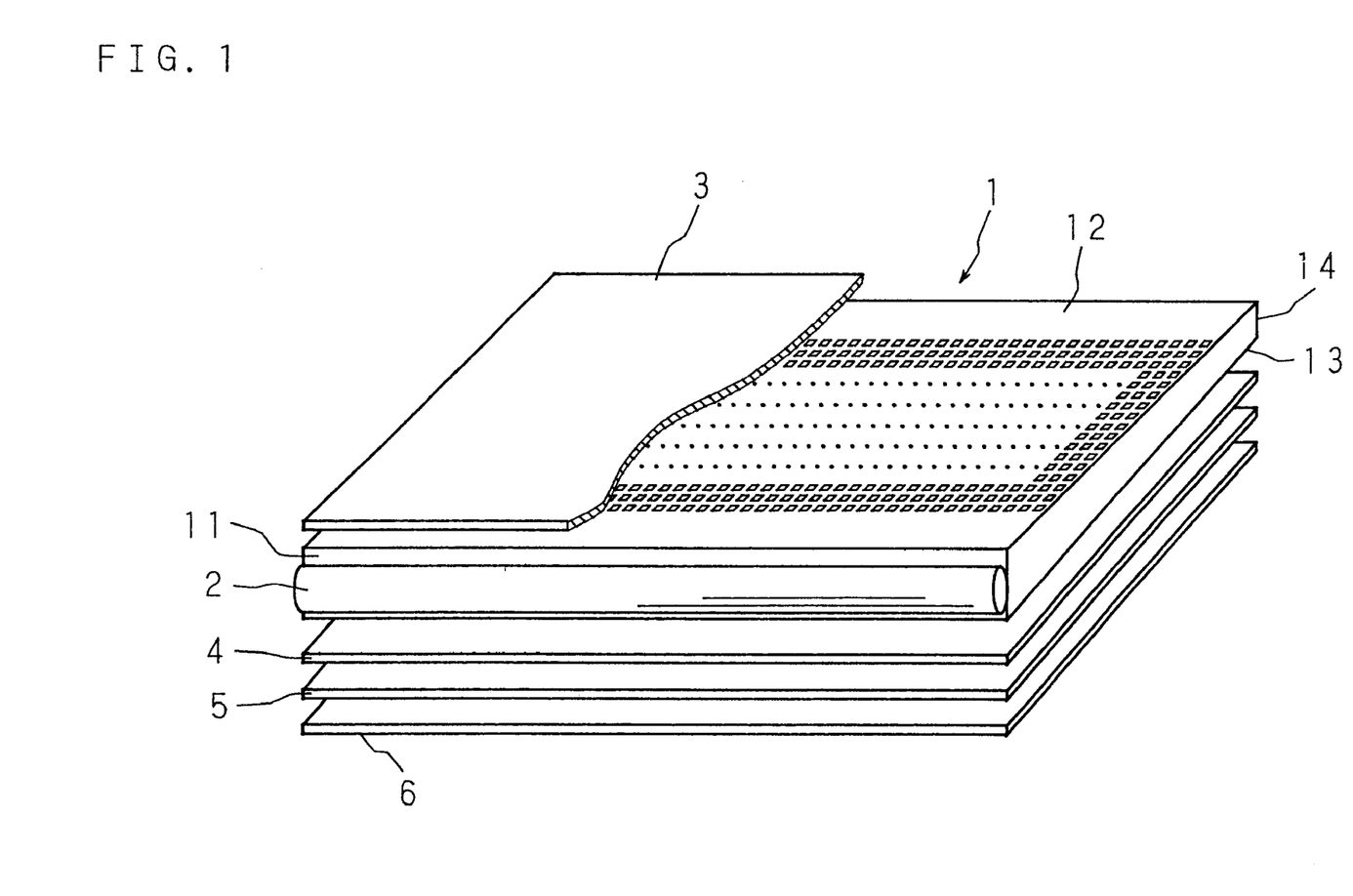
FIG. 1 is a partially exploded perspective view illustrating a construction of a back lighting device according to the present invention.

FIG. 1 is a partially exploded perspective view illustrating a structure of a back lighting device according to the present invention. Referring to FIG. 1, the back lighting device is a long-side one-light type back lighting device in which a linear light source 2 is mounted to a back lighting device unit constructed in close contact by superposing a diffusing plate 4, a first prism sheet 5, and a second prism sheet 6 in this order on a side of a light conducting plate 1 close to a light-outlet surface 13 and superposing a reflecting plate 3 on a side of the light conducting plate 1 close to a reflecting surface 12. The first and second prism sheets 5 and 6 each have a prism surface on whose upper surface a plurality of triangular convex streaks are disposed in parallel so that streak directions of the first and the second prism sheets 5 and 6 are perpendicular to each other. In FIG. 1, for clarity of understanding, the light conducting plate 1, the diffusing plate 4, the first and second prism sheets 5 and 6, and the reflecting plate 3 are shown in a non-contacted state.

Figure 2:
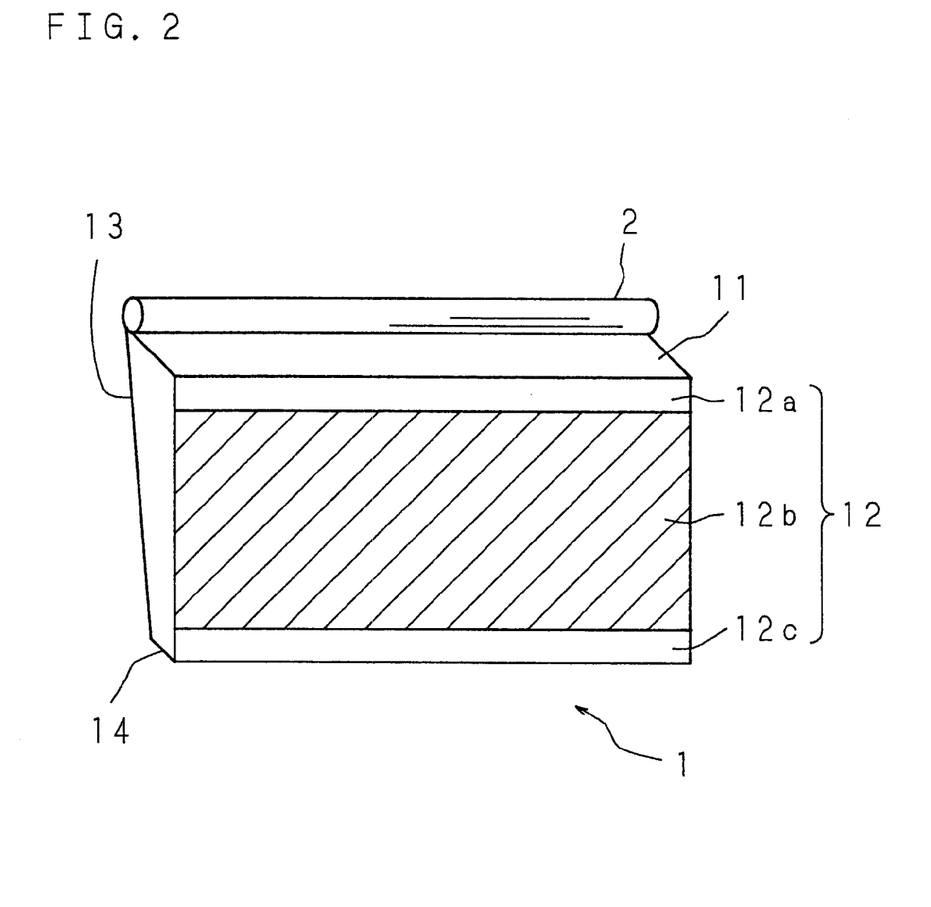
FIG. 2 is a perspective view illustrating the light conducting plate of FIG. 1 together with the linear light source.

FIG. 2 is a perspective view illustrating the light conducting plate of FIG. 1 together with the linear light source. The light conducting plate 1 is made of an acrylic resin and has an about wedge-like shape in which the reflecting face 12 and the light-outlet face 13 are formed in a non-parallel configuration. The linear light source 2 is facing the light-inlet end face 11 which is located on the thick side of the light conducting plate 1, and a reflecting tape (not shown) is allowed to adhere to the thin end face 14 as opposed to the light-inlet end face. In the light conducting plate 1, the reflecting face 12 is molded into a mirror-like surface at the time of injection molding, and a light-scattering region 12b is formed on a partial region of the reflecting face 12 by dot printing with white ink (See FIG. 1, shown by hatches in FIG. 2). Referring to FIG. 2, the light scattering region 12b is formed in a range excluding the scatter-suppressing region 12a which is located on the reflecting face 12 to approximately 1 mm through 2 mm width region along the light-inlet end face 11 and the scatter-suppressing region 12c which is located on the reflecting face 12 to approximately 1 mm through 2 mm width region along the thin end face 14. The scatter-suppressing regions 12a and 12c are maintained in a mirror-like surface state, and have a less degree of scattering of the light than that of the light scattering region 12b. In other words, the scatter-suppressing regions 12a and 12c have a smaller degree of irregular reflection than the light scattering region 12b.

In a back lighting device having such a construction, the light emitted from the linear light source 2 is introduced through the light-inlet end face 11 of the light conducting plate 1 to be reflected by the reflecting face 12 and the reflecting plate 3 and the introduced light is transmitted through the light conducting plate 1 in a direction intersecting the light-inlet end face 11 to emit through the light-outlet face 13 of the light conducting plate 1. At this time, the introduced light is reflected and scattered at the light-scattering region 12b of the reflecting face 12 to improve the luminance of the light-outlet face 13. Although abnormal light emission is liable to take place on the side near to and the side distant from the linear light source 2 due to complex reflection of the introduced light as described before, the abnormal light emission is suppressed at the scatter-suppressing regions 12a and 12c as compared with the light-scattering region 12b, owing to less scattering of the introduced light.

Here, in this embodiment, explanation has been given on a case where the light-scattering region 12b is formed by dot printing. However, it is not limited to this construction alone.

For example, similar effects may be produced by allowing the light scattering region 12b to be a region subjected to satin finish and allowing the scatter-suppressing regions 12a and 12c to be regions subjected to mirror-like surface processing.

Embodiment 2

In the above-described Embodiment 1, explanation has been given on a case in which the scatter-suppressing region is located in both to 1 mm through 2 mm width region along the light-inlet end face 11 and to 1 mm through 2 mm width region along the thin end face 14. However, it is not limited to this alone. The region and the dimension of the scatter-suppressing region is preferably determined in accordance with the region of the light-outlet region where the abnormal light-emission occurs. This region may vary depending on the dimension of the light conducting plate, the power of the linear light source, and others. Hereafter, an explanation will be given by citing several examples.

Figure 3:
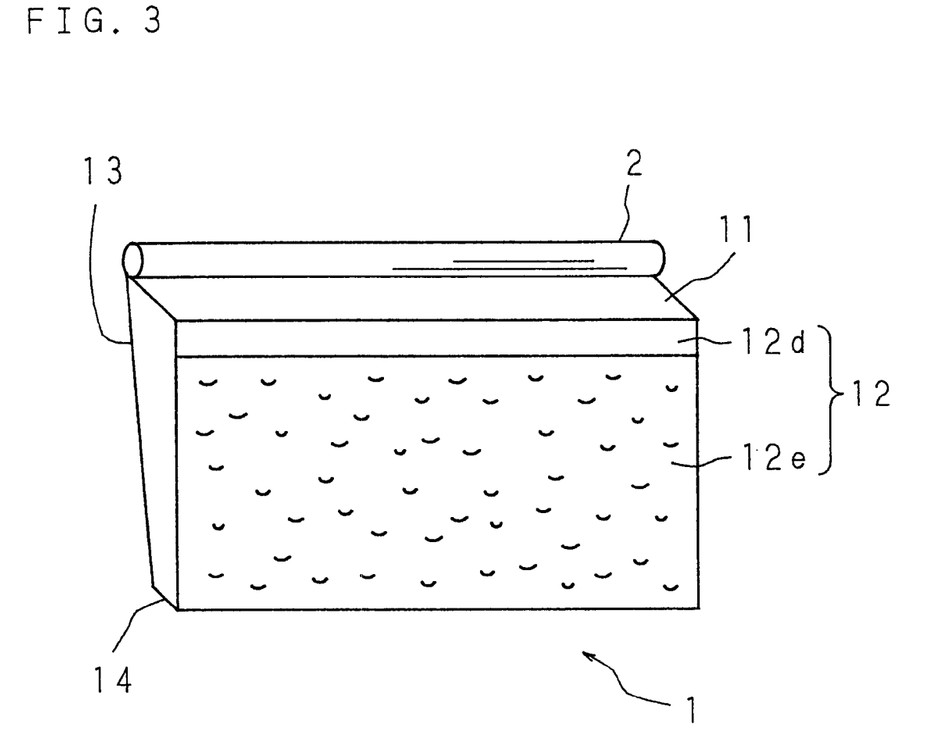
FIG. 3 is a perspective view illustrating a structure of a back lighting device according to Embodiment 2.

FIG. 3 is a perspective view illustrating a structure of a back lighting device according to Embodiment 2, where only the light conducting plate 1 and the linear light source 2 are shown. In the light conducting plate 1 made of an acrylic resin, a satin finished light-scattering region 12e is formed on a partial region of the reflecting face 12. The light scattering region 12e is formed in a range excluding the scatter-suppressing region 12d which is located on the reflecting face 12 to approximately 1 mm through 2 mm width region along the light-inlet end face 11. The scatter-suppressing region 12d maintains a mirror-like surface state formed at the time of injection molding, and the reflection of light at the scatter-suppressing region 12d has a less degree of scattering than that of the light-scattering region 12e. Here, the construction of the other elements in the back lighting device is the same as in Embodiment 1, so that an explanation thereof will be omitted.

Such a back lighting device is effectively applied to a light conducting plate of a type in which the abnormal light-emission is liable to take place on a side of the light-outlet face 13 near to the light-inlet end face 11. Since the scatter-suppressing region 12d has less scattering of the introduced light, the abnormal light-emission is suppressed on the inlet side. Here, the dimension of the scatter-suppressing region 12d is determined in accordance with the dimension of the region of the light-outlet face 13 where the abnormal light-emission is liable to take place.

Embodiment 3

Figure 4:
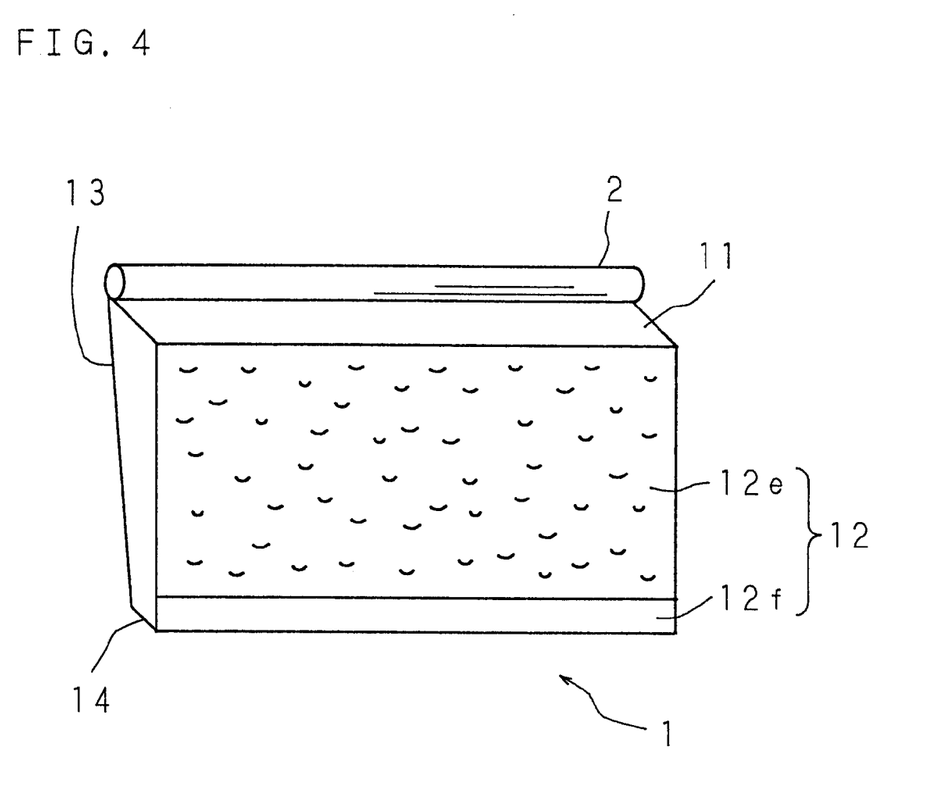
FIG. 4 is a perspective view illustrating a structure of a back lighting device according to Embodiment 3.

FIG. 4 is a perspective view illustrating a structure of a back lighting device according to Embodiment 3, where only the light conducting plate 1 and the linear light source 2 are shown. In the light conducting plate 1 made of an acrylic resin, a satin finished light-scattering region 12e is formed on a partial region of the reflecting face 12. The light scattering region 12e is formed in a range excluding the scatter-suppressing region 12f which is located on the reflecting face 12 to approximately 1 mm through 2 mm width region along the side of the thin end face 14 distant from the linear light source 2. The scatter-suppressing region 12f maintains a mirror-like surface state formed at the time of injection molding, and the reflection of light at the scatter-suppressing region 12f has a less degree of scattering than that of the light-scattering region 12e. Here, the construction of the other elements in the back lighting device is the same as in Embodiment 1, so that an explanation thereof will be omitted.

Such a back lighting device is effectively applied to a light conducting plate of a type in which the abnormal light-emission is liable to take place on a side of the light-outlet face 13 distant from the linear light source 2. Since the scatter-suppressing region 12f has less scattering of the light introduced into the light conducting plate 1, the abnormal light-emission is suppressed. Here, the dimension of the scatter-suppressing region 12f is determined in accordance with the dimension of the region of the light-outlet face 13 where the abnormal light-emission is liable to take place.

Here, in Embodiments 2 and 3, explanation has been given on a case where the light-scattering region is formed by satin finish. However, similar effects may be produced even if the light-scattering region is formed by dot printing.

Embodiment 4

Figure 5:
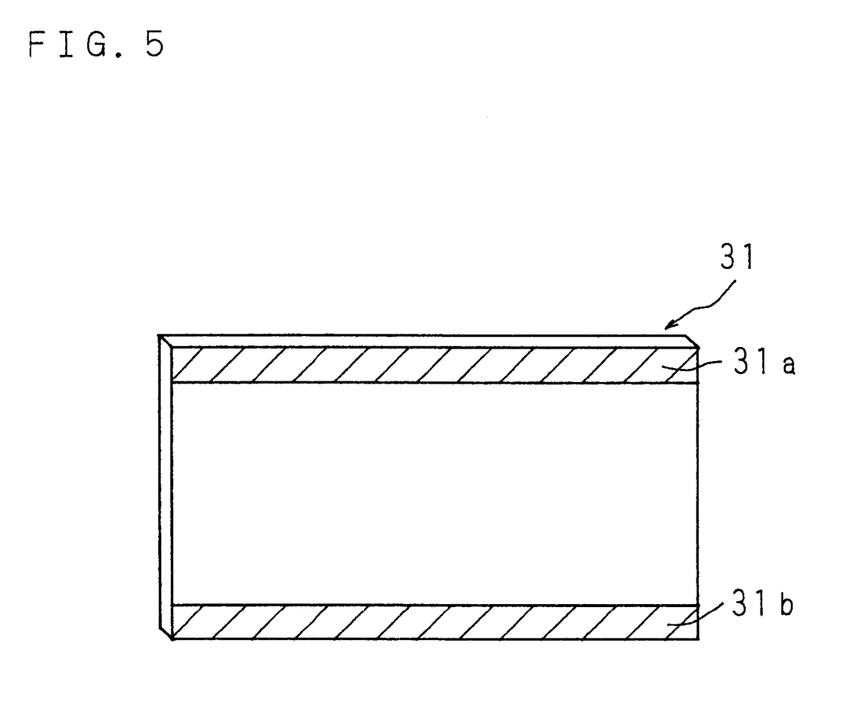
FIG. 5 is a perspective view illustrating a structure of a reflecting plate according to the present invention.
Figure 6:
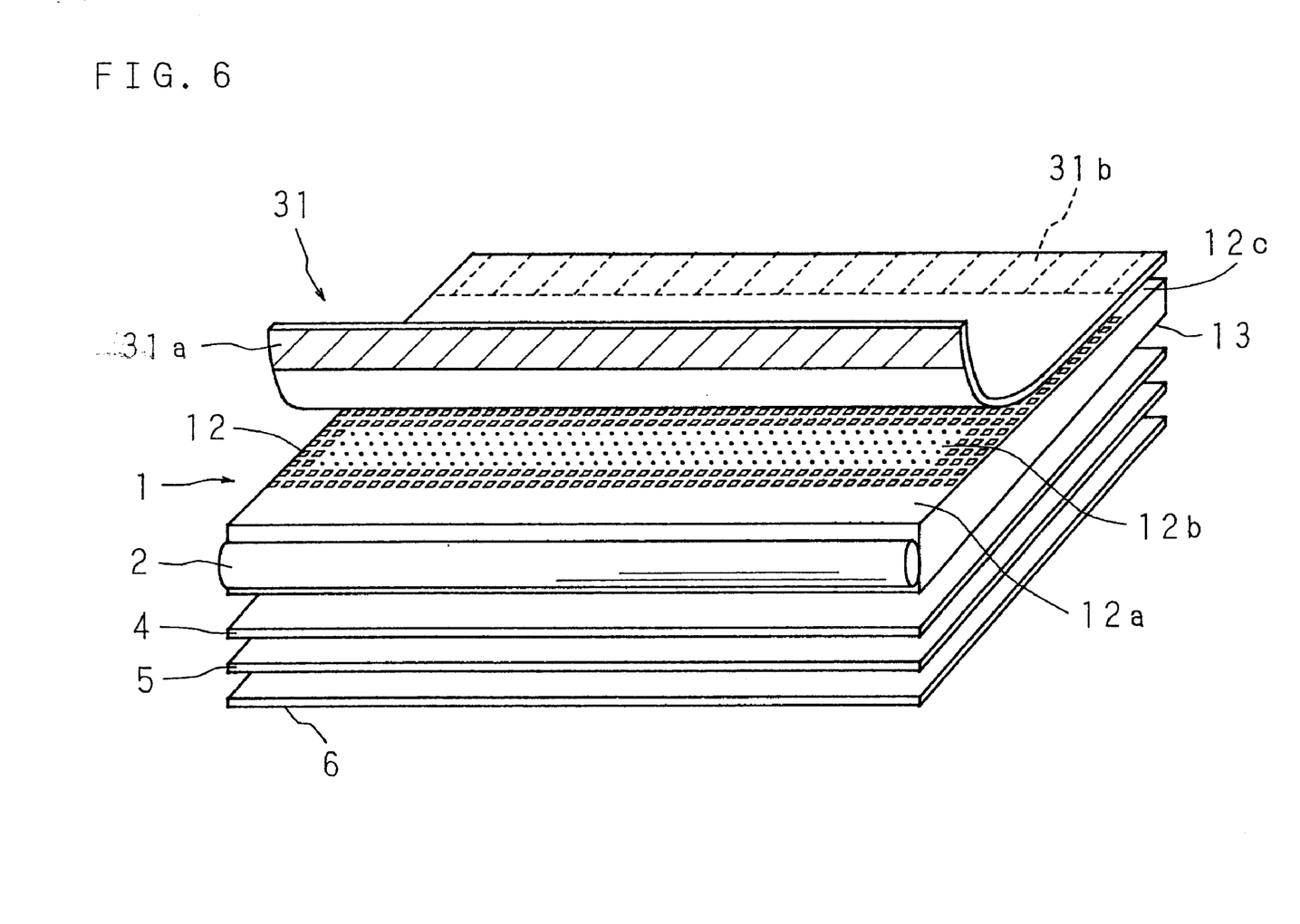
FIG. 6 is a perspective view illustrating a construction of a back lighting device using the reflecting plate of FIG. 5.

Hereafter, an explanation will be given on a back lighting device capable of further suppressing the abnormal light-emission of the light-outlet face. FIG. 5 is a perspective view illustrating a structure of a reflecting plate according to the present invention, and FIG. 6 is a perspective view illustrating a construction of a back lighting device using the reflecting plate of FIG. 5, where the reflecting plate is drawn so that the surface thereof facing the light conducting plate can be seen. Referring to FIGS. 5 and 6, a light conducting plate 1 is made of an acrylic resin and has an about wedge-like shape in which a reflecting face 12 and a light-outlet face 13 are formed in a non-parallel configuration. A light-scattering region 12b is formed on a partial region of the reflecting face 12 of the light conducting plate 1 by dot printing with white ink. The light scattering region 12b is formed in a range excluding a first and a second scatter-suppressing regions 12a and 12c. The first scatter-suppressing region is located on the reflecting face 12 to approximately 1 mm through 2 mm width region along the light-inlet end face 11. The second scatter-suppressing region 12c is located on the reflecting face 12 to approximately 1 mm through 2 mm width region along the thin end face 14. The first and second scatter-suppressing regions 12a, 12c maintain a mirror-like surface state formed at the time of injection molding, and the reflection of light at these regions has a less degree of scattering than that of the light-scattering region 12b.

A reflecting plate 31 is facing the reflecting face 12 of the light conducting plate 1 described above. The reflecting plate 31 includes light-absorbing portions 31a and 31b of 1 mm to 2 mm width formed by printing on both end regions of one surface so as to be disposed that the surface having the light-absorbing portions 31a and 31b formed thereon is faced the reflecting face 12 of the light conducting plate 1. The light-absorbing portions 31a and 31b of the reflecting plate 31 are facing the scatter-suppressing regions 12a and 12b of the light conducting plate 1, respectively. The light-absorbing portions 31a and 31b are formed by printing with black or gray ink and may be formed by being subjected to dot printing or set-solid printing. The construction of the other elements in the back lighting device is the same as in Embodiment 1, so that an explanation thereof will be omitted.

In such a back lighting device, the degree of scattering is reduced by the scatter-suppressing regions 12a and 12c on the sides of the light-outlet face 13 near to and distant from the linear light source 2, and the reflected light is further absorbed by the light-absorbing portions 31a and 31b of the reflecting plate 31, whereby the abnormal light-emission is further suppressed.

Figure 7:
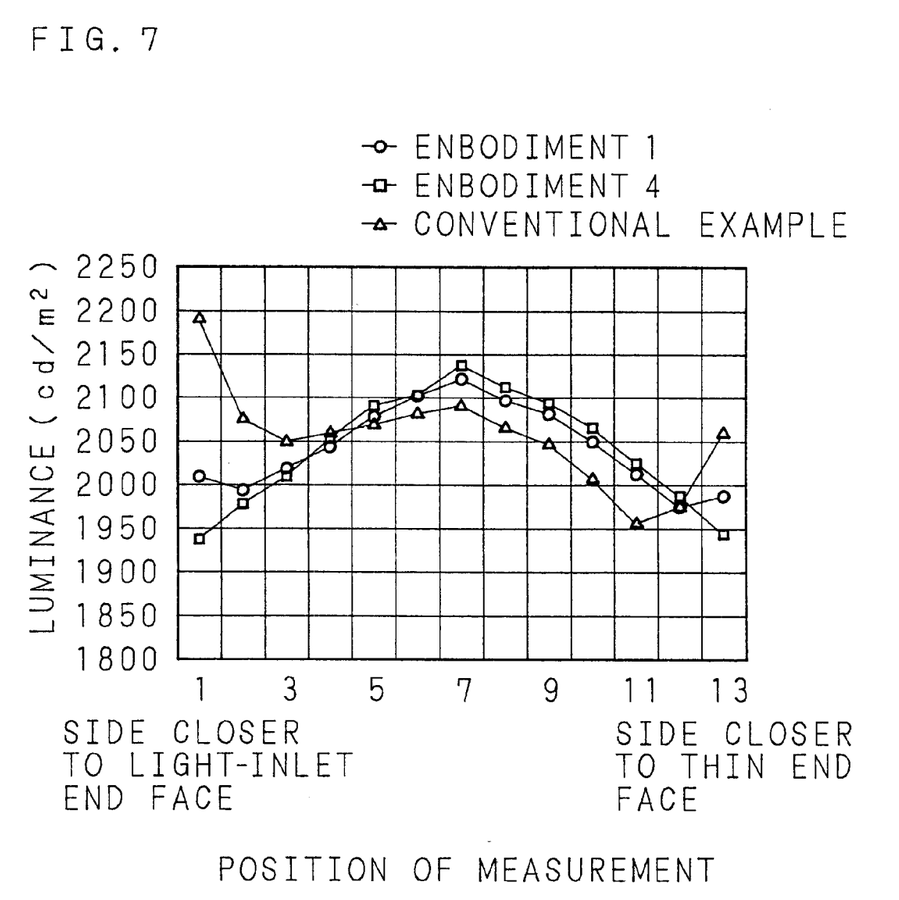
FIG. 7 is a graph showing measurement of luminance produced by the back lighting devices of Embodiments 1 and 4 at each measurement position.

The luminance was measured on the light-outlet face of the above-described back lighting devices shown in Embodiment 1 and Embodiment 4. The light conducting plate was 10.4 inch dimension, and the scatter-suppressing region was formed to extend to both ends along the end face, and its dimension was 230 mm width on the side near to the light-inlet end face and 141 mm width on the side near to the thin end face. An electric current of 6.0 mA was supplied to the linear light source 2 of 2.4 mmφ. For comparison, the luminance of the back lighting device using a conventional light conducting plate was measured like the above-described back lighting device. The conventional light conducting plate as used herein includes a light-scattering region formed by dot printing or satin finishing on the entire region of the reflecting face. Table 1 shows the results of measurement. FIG. 7 shows a graph obtained from Table 1. The vertical axis represents the luminance and the horizontal axis represents the position of measurement on the light-outlet face. The luminance was measured by disposing measurement positions No. 1 to No. 13 at a pitch of 10 mm from the side near to the light-inlet end face 11 to the thin end face 14 of the light-outlet face 13.

As will be understood from Table 1 and the graph, the luminance at the measurement positions No. 1 (near to light-inlet end face) and No. 13 (near to thin end face) is higher than the luminance of the surroundings in the conventional example, showing abnormal light-emission. In contrast, in Embodiment 1, it is understood that the luminance at the side near to the light-inlet end face and the side near to the thin end face is the same degree as the luminance of the surroundings. Therefore, no generation of abnormal light-emission is seen on either end side of the light-outlet face, so that the luminance is made uniform on the light-outlet face. Further, in Embodiment 4 where the light-absorbing portion is disposed on the reflecting plate, the luminance on the both sides near to the light-inlet end face and the thin end face was lower than that in Embodiment 1, showing no generation of abnormal light-emission.

Here, in the above-described Embodiments 1 to 4, explanation has been given on a case in which the scatter-suppressing region is formed to extend from end to end along the end face. However, it is not limited to this alone, and the scatter-suppressing region may be formed on the center or the end side of the reflecting face in accordance with the region where the abnormal light-emission is liable to occur.

In the above-described Embodiments 1 to 4, explanation has been given by citing a back lighting device having a diffusing plate and two prism sheets superposed on the light conducting plate 1 as an example. However, it is not limited to this alone, and similar effects may be produced in a back lighting device of a type that does not use a diffusing plate as described above or of a type that uses one prism sheet utilizing the directivity. Further, the light conducting plate is not limited to a wedge-shaped one, and may have a flat plate shape.

Embodiment 5

Figure 8:
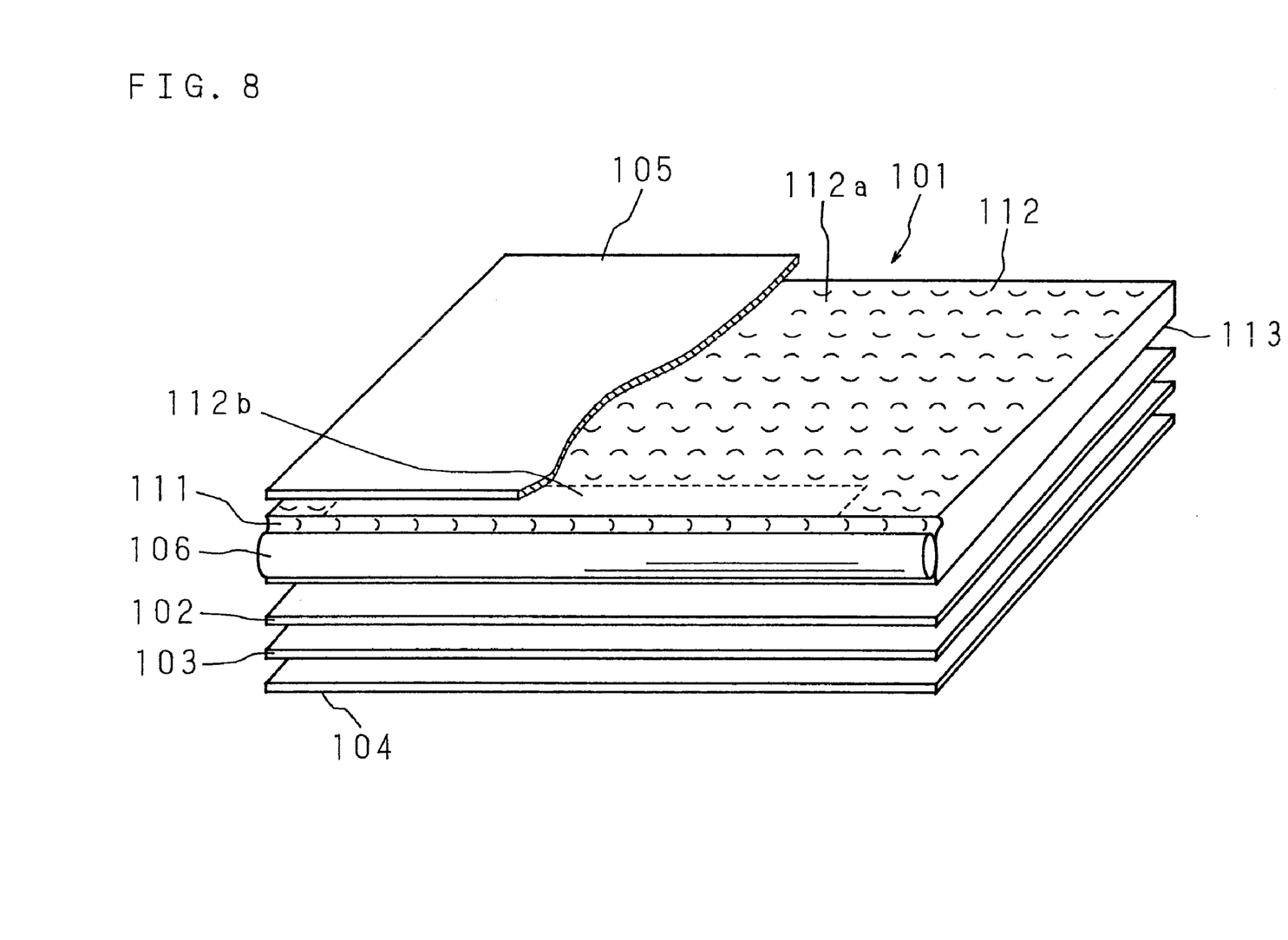
FIG. 8 is a partially exploded perspective view illustrating a construction of a back lighting device according to Embodiment 5.
Figure 9:
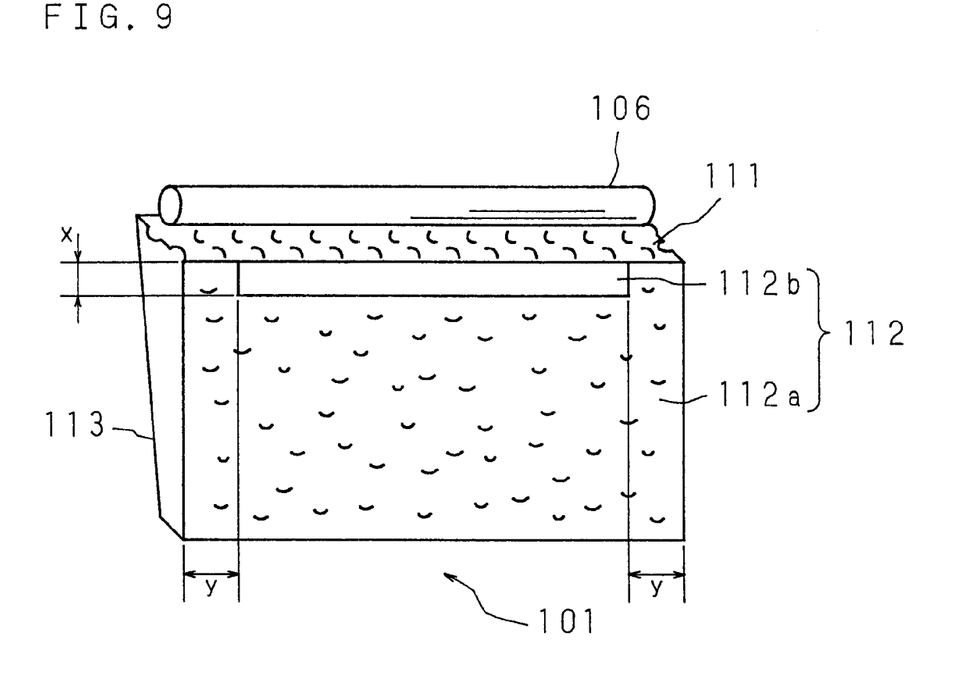
FIG. 9 is a perspective view illustrating a structure of the light conducting plate and the linear light source of FIG. 8.

FIG. 8 is a partially exploded perspective view illustrating a construction of a back lighting device according to the present invention, and FIG. 9 is a perspective view illustrating the light conducting plate of FIG. 8 together with the linear light source. Referring to FIG. 8, the back lighting device is a long-side one-light type back lighting device in which a linear light source 106 is mounted to a back lighting device unit constructed in close contact by superposing a diffusing plate 102, a first prism sheet 103, and a second prism sheet 104 in this order on a light-outlet face 113 of a light conducting plate 101 and superposing a reflecting plate 105 on a reflecting face 112 of the light conducting plate 101. The first and second prism sheets 103 and 104 each have a prism surface on which a plurality of triangular convex streaks are disposed in parallel so that the prism surface is directed towards the light conducting plate and streak directions of the first and the second prism sheets 5 and 6 are perpendicular to each other. In FIG. 8, for clarity of understanding, the light conducting plate 101, the diffusing plate 102, the first and second prism sheets 103 and 104, and the reflecting plate 105 are shown in a non-contacted state.

The light conducting plate 101 as a characteristic feature of the present invention is made of an acrylic resin and has an about wedge-like shape in which the reflecting face 112 and the opposing light-outlet face 113 are formed in a non-parallel configuration, as illustrated in FIGS. 8 and 9. A light-inlet end face 111 on the thick side of the light conducting plate 101 is subjected to a surface roughening process by drilling the surface of the light conducting plate 101 with a tool such as an end mill after injection molding of the light conducting plate 101. The degree of surface roughening is, for example, the maximum height of 4.5 μm to 5.5 μm, a 10-point average roughness of 3.5 μm to 4.5 μm, and an average lineal depth of 2.5 μm to 3.5 μm. By surface roughening the light-inlet end face, the dark line caused by imaging of the light-inlet end face can be prevented.

A linear light source 106 is facing the light-inlet end face 111. At the time of injection molding of the light conducting plate 101, the reflecting face 112 is molded into a mirror-like surface and thereafter a satin finishing process is performed by a sand blast on a region of the reflecting face 112 excluding a predetermined region, thereby to form a light-scattering region 112a. The region where the light-scattering region 112a is not formed is located on a central region of the reflecting face 112 near to the light-inlet end face 111. The region maintains a mirror-like surface to form a scatter-suppressing region 112b. The scatter-suppressing region 112b reflects the light at a smaller scattering degree than the light-scattering region 112a. In other words, the scatter-suppressing region 112b has a smaller degree of irregular reflection than the light-scattering region 112a.

In a back lighting device having such a construction, the light emitted from the linear light source 106 is introduced through the light-inlet end face 111 of the light conducting plate 101 and proceeds through the light conducting plate 101 while being reflected by the reflecting face 112 and the reflecting plate 105. The light is then allowed to emit through the light-outlet face 113 and repeats a process of being diffused and condensed while being transmitted through the diffusing plate and the two prism sheets to irradiate, for example, a liquid crystal display device disposed on an upper layer of the back lighting device. At this time, the introduced light is reflected and scattered by the light-scattering region 112a of the reflecting face 112 to improve the luminance of the light-outlet face 113. As described before, imaging of the light-inlet end face 111 can be prevented by performing a surface roughening process on the light-inlet end face 111. The more rough the light-inlet end faced 111 is, the more the dark line can be removed. However, the more rough the light-inlet end face 111 is, the more the leakage of light is liable to be generated on the light conducting plate 101 near to the linear light source 106. However, in Embodiment 5, since the scatter-suppressing region 112b is provided on a region of the reflecting face 112 near to the linear light source, the scattering of the introduced light is smaller at the scatter-suppressing region 112b, whereby the luminance is lowered at the side of the light-outlet face 113 near to the linear light source 106 to suppress the leakage of light.

Here, the dimension of the scatter-suppressing region 112b having a mirror-like surface is preferably x=1.0 mm to 2.0 mm from the light-inlet end face in the direction of introducing the light, and is preferably a central region excluding y=5 mm to 10 mm from both ends in the longitudinal direction of the linear light source 106. The more the x dimension of the scatter-suppressing region 112*b* is, the more the leakage of light can be prevented. However, if the x dimension exceeds 2.0 mm, there is a fear that the dark line is generated. As for the dimension in the longitudinal direction, if the y dimension of the end portions is less than 5 mm, the luminance on both end portions is too low, whereas if the y dimension exceeds 10 mm, there is a fear that the leakage of light is generated on the end portions.

Figure 10:
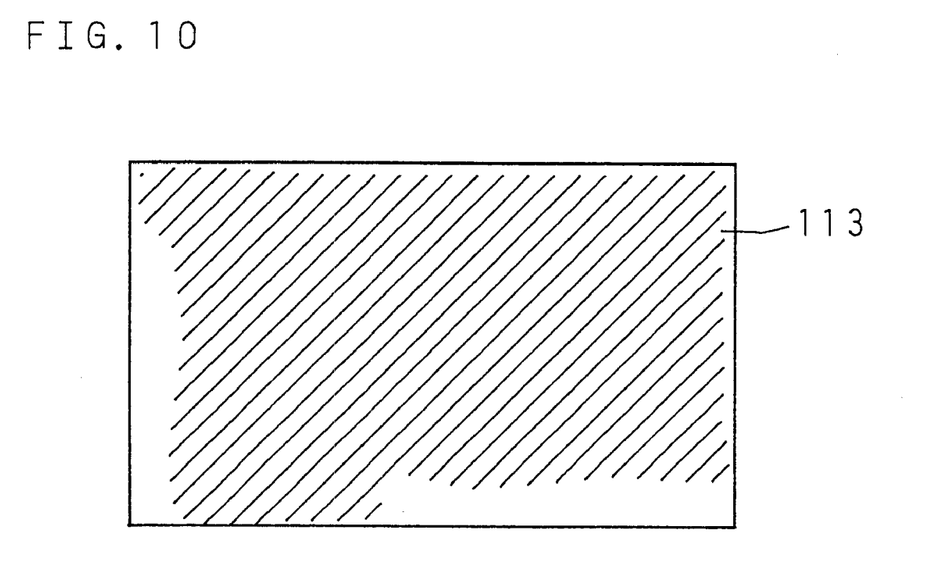
FIG. 10 is a model view showing the luminance as viewed from the light-outlet face of the back lighting device of Embodiment 5.
Figure 11:
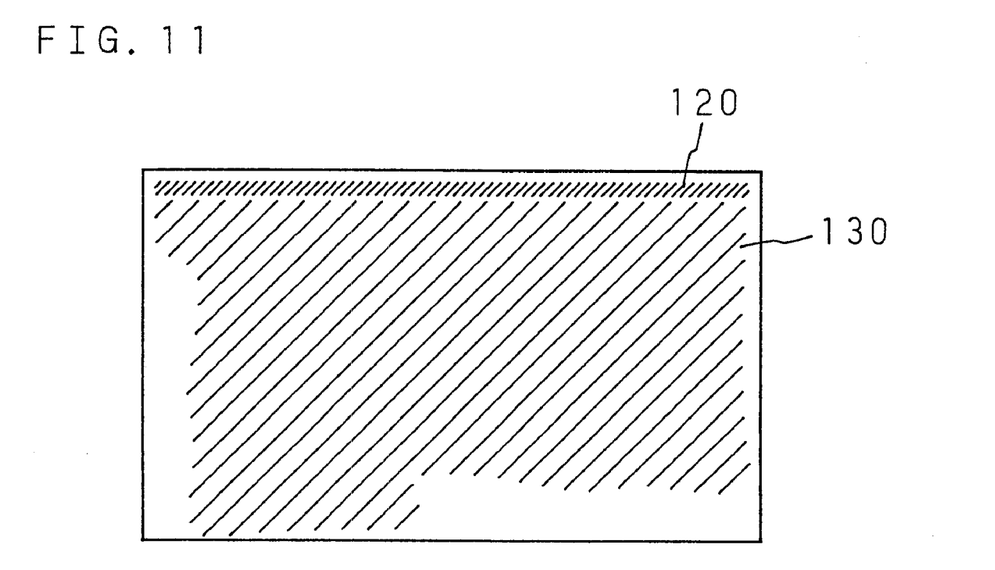
FIG. 11 is a model view showing the luminance as viewed from the light-outlet face of the back lighting device of comparative example.

FIG. 10 is a model view showing the luminance of the back lighting device using the above-described light conducting plate of Embodiment 5 as viewed from the light-outlet face 113. FIG. 11 is a model view likewise showing the luminance of the light conducting plate of comparative example in which the light-inlet end face is subjected to a surface roughening process and the light-scattering region is provided over the entire surface of the reflecting face. In both FIGS. 10 and 11, the bright portions are shown in hatches. It will be understood that the light-outlet face 113 of Embodiment 5 shows an approximately uniform luminance as shown in FIG. 10, whereas in the light-outlet face 130 of comparative example, a bright line 120 appears due to leakage of light, as shown in FIG. 11, showing that the leakage of light is generated. Thus, in Embodiment 5, the dark line can be removed by performing a surface roughening process on the light-inlet end face 111, and further, the leakage of light caused by roughness of the light-inlet end face 111 is prevented by providing a mirror-like surface region as a scatter-suppressing region 112*b* on a region of the reflecting face 112 near to the light-inlet end face 111.

Here, by adjusting the degree of surface roughening to be performed on the light-inlet end face of the light conducting plate and by using a light conducting plate in which the light-scattering region is formed over the entire region of the light-outlet face and no scatter-suppressing region is provided, the dark line of the light-outlet face can be prevented to produce a uniform luminance.

Embodiment 6

Figure 12:
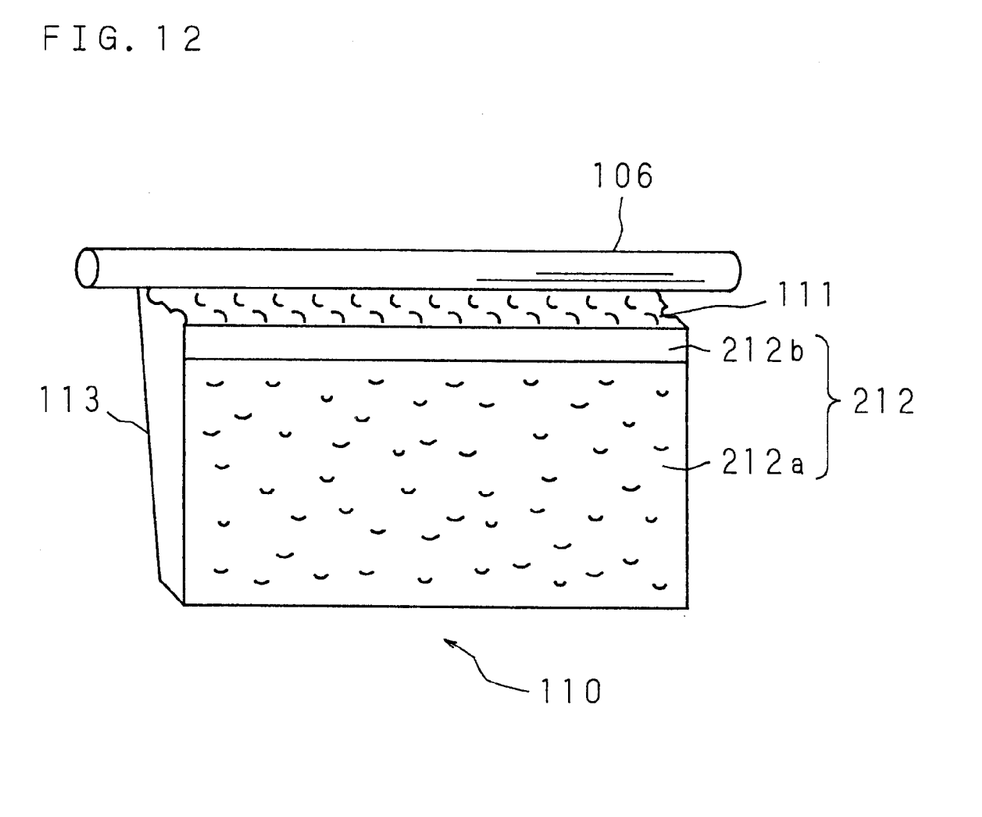
FIG. 12 is a perspective view illustrating the light conducting plate of Embodiment 6 together with the linear light source.

FIG. 12 is a perspective view illustrating the light conducting plate of Embodiment 6 together with the linear light source. The linear light source 106 is facing the light-inlet end face 111 of the light conducting plate 110, and has a length larger than that of the light-inlet end face 111. Since the linear light source 106 extends beyond the end portions of the light-inlet end face 111, the luminance of the light-outlet face 113 of the light conducting plate 110 can be made uniform along the light-inlet end face 111. The light-inlet end face 111 of the light conducting plate 110 is subjected to surface roughening process to prevent the dark line caused by imaging. Further, a light-scattering region 212*a* is formed by a sand blast on the reflecting face 212 except for the region near to the light-inlet end face 111 along the light-inlet end face 111. The scatter-suppressing region 212*b* where the light-scattering region 212*a* is not formed is a region that extends to both ends along the light-inlet end face 111, and this region maintains a mirror-like surface. The other portions of the light conducting plate and the construction of the back lighting device are similar to those described above in Embodiment 5, so that an explanation thereof will be omitted.

In the light conducting plate having such a construction, since the linear light source 106 has a larger length than the light-inlet end face 111 and the luminance of the light-outlet face 113 is made uniform along the light-inlet end face 111, the luminance on both end sides will not be too low even if the scatter-suppressing region 212*b* is provided on a region from end to end. Therefore, effects similar to those of Embodiment 5 can be produced.

Here, in the above-described Embodiment 5 and Embodiment 6, an explanation has been given on a case where the light-scattering regions 112*a* and 212*a* are formed by a sand blast. However, it is not limited to this alone, and they may be formed by chemical etching, laser processing, or mold processing of the light conducting plate, whereby similar effects are produced.

Further, in the above-described Embodiment 5 and Embodiment 6, explanation has been given by citing a back lighting device of a long-side one-light type as an example. However, it is not limited to this alone, so that the back lighting device may be a short-side one-light type, a long-side two-light type or the like. In the case of a long-side two-light type, there are two light-inlet end faces and the scatter-suppressing region is formed on a region near to each light-inlet end faces. Furthermore, the light conducting plate is not limited to wedge-shape alone, and a flat plate shape may produce similar effects.

Here, in the above-described Embodiments 1 to 6, an explanation has been given by citing a case in which the scatter-suppressing region is a mirror-like surface as an example. However, it is not limited to this alone, and it is sufficient that the light-suppressing region is in a surface state having a smaller scattering degree than the light-scattering region.

As described above, in the present invention, since the scatter-suppressing region is located on the region of the light-outlet face of the light conducting plate near to and/or distant from the light-inlet end face and the light-scattering region is provided on a region excluding the scatter-suppressing region, scattering can be suppressed on a region where abnormal light-emission is liable to occur, whereby the abnormal light-emission can be prevented.

Further, since the light-absorbing region is provided on a region of the reflecting plate that opposes the scatter-suppressing region and the reflected light is absorbed in a region where abnormal light-emission is liable to occur, the abnormal light-emission can be prevented in a better manner.

In addition, in the present invention, since the light-inlet surface of the light conducting plate is subjected to a surface roughening process, the dark line of the light-outlet face can be prevented. Further, since the scatter-suppressing region that maintains a mirror-like surface is located on the side of the reflecting face near to the light-inlet end face, reflection and scattering of the leaking light caused by the roughness of the light-inlet end face is suppressed in the region, thereby to prevent leakage of light.

Furthermore, in the case where a linear light source having a larger length than the light-inlet end face is provided, the present invention produces excellent effects such as preventing leakage of light and providing uniform luminance by allowing not only the central region but also the region from end to end along the light-inlet end face to maintain a mirror-like surface.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| Measurement position No. (from light-inlet end face) | Luminance (cd/m²) | | |
|---|---|---|---|
| | Embodiment 1 | Embodiment 4 | Conventional Example |
| 1 | 2011 | 1941 | 2192 |
| 2 | 1997 | 1980 | 2075 |
| 3 | 2019 | 2011 | 2050 |
| 4 | 2048 | 2054 | 2058 |
| 5 | 2078 | 2088 | 2071 |
| 6 | 2106 | 2103 | 2084 |
| 7 | 2120 | 2136 | 2092 |
| 8 | 2098 | 2112 | 2067 |
| 9 | 2080 | 2096 | 2046 |
| 10 | 2051 | 2065 | 2008 |
| 11 | 2013 | 2024 | 1958 |
| 12 | 1977 | 1989 | 1975 |
| 13 | 1986 | 1945 | 2060 |

What is claimed is:

1. A light conducting plate for a back lighting device, comprising:
   a light-inlet end face for introducing light emitted from a light source to be disposed facing said light conducting plate;
   a reflecting face for reflecting the light introduced through said light-inlet end face; and
   a light-outlet face disposed opposite to said reflecting face for allowing the light reflected from the reflecting face to emit therethrough,
   wherein said reflecting face includes a light-scattering region and a remainder region, and the remainder region is located on a side near to said light-inlet end face.

2. The light conducting plate according to claim 1, wherein said remainder region is a region having less irregularity of reflection of the introduced light than said light-scattering region.

3. The light conducting plate according to claim 1, wherein said light-scattering region has been subjected to dot printing on a surface thereof, and said remainder region is a mirror-like surface.

4. The light conducting plate according to claim 1, wherein said light-scattering region has an irregular surface, and said remainder region has a mirror-like surface.

5. A light conducting plate for a back lighting device, comprising:
   a light-inlet end face for introducing light emitted from a light source to be disposed facing said light conducting plate;
   a reflecting face for reflecting the light introduced through said light-inlet end face; and
   a light-outlet face disposed opposite to said reflecting face for allowing the light reflected from the reflecting face to emit therethrough,
   wherein said reflecting face includes a light-scattering region and a remainder region, and the remainder region is located on a side near to an opposite face from said light-inlet end face.

6. The light conducting plate according to claim 5, wherein said remainder region is a region having less irregularity of reflection of the introduced light than said light-scattering region.

7. The light conducting plate according to claim 5, wherein said light-scattering region has been subjected to dot printing on a surface thereof, and said remainder region is a mirror-like surface.

8. The light conducting plate according to claim 5, wherein said light-scattering region has an irregular surface, and said remainder region is a mirror-like surface.

9. The light conducting plate according to claim 5, wherein said remainder region is located also on a side near to said light-inlet end face.

10. A back lighting device comprising:
    a light conducting plate according to claim 1;
    a light source disposed facing said light-inlet end face of said light conducting plate; and
    a reflector being superposed on said reflecting face of said light conducting plate,
    wherein said reflector includes a light-absorbing region located on a region facing said remainder region of said light conducting plate.

11. A light conducting plate for a back lighting device, comprising:
    a light-inlet end face for introducing light emitted from a light source to be disposed facing said light conducting plate;
    a reflecting face having a light-scattering region for reflecting the light introduced through said light-inlet end face; and
    a light-outlet face disposed opposite to said reflecting face for allowing the light reflected from the reflecting face to emit therethrough,
    wherein said light-inlet end face is a roughened surface, wherein said reflecting face includes a remainder region except said light-scattering region, on a side near to said light-inlet end face.

12. The light conducting plate according to claim 11, wherein said remainder region is a region having less irregularity of reflection of the introduced light than said light-scattering region.

13. The light conducting plate according to claim 11, wherein said remainder region is disposed in a central region along said light-inlet end face.

14. The light conducting plate according to claim 11, wherein said light-scattering region has an irregular surface, and said remainder region is a mirror-like surface.

15. A back lighting device comprising:
    a light conducting plate according to claim 5;
    a light source facing said light-inlet end face of said light conducting plate; and
    a reflector being superposed on said reflecting face of said light conducting plate,
    wherein said reflector includes a light-absorbing region located in a region facing said remainder region of said light conducting plate.

16. A back lighting device comprising:
    a light conducting plate according to claim 9;
    a light source facing said light-inlet end face of said light conducting plate; and
    a reflector being superposed on said reflecting face of said light conducting plate,
    wherein said reflector includes a light-absorbing region located in a region facing said remainder region of said light conducting plate.

17. A back lighting device comprising:
    a light conducting plate according to claim 11; and
    a light source disposed facing said light-inlet end face of said light conducting plate.

* * * * *